United States Patent
Lopes

(10) Patent No.: US 6,905,012 B2
(45) Date of Patent: Jun. 14, 2005

(54) DEVICE FOR INVERTING A HOLLOW BODY

(75) Inventor: Jean-Emmanuel Lopes, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 10/399,174

(22) PCT Filed: Oct. 22, 2001

(86) PCT No.: PCT/FR01/03267

§ 371 (c)(1),
(2), (4) Date: Jul. 24, 2003

(87) PCT Pub. No.: WO02/34652

PCT Pub. Date: May 2, 2002

(65) Prior Publication Data

US 2004/0025909 A1 Feb. 12, 2004

(30) Foreign Application Priority Data

Oct. 23, 2000 (FR) .............................. 00 13533

(51) Int. Cl.⁷ .............................................. B65G 47/24
(52) U.S. Cl. ...................... 198/404; 198/406; 198/403; 198/478.1
(58) Field of Search ................................. 198/402, 403, 198/404, 406, 407, 470.1, 478.1; 134/62, 134

(56) References Cited

U.S. PATENT DOCUMENTS

| | | | |
|---|---|---|---|
| 2,415,997 A | | 2/1947 | John |
| 3,583,544 A | * | 6/1971 | Prodzenski ................. 198/404 |
| 4,735,761 A | * | 4/1988 | Lindenberger .............. 198/406 |
| 5,558,200 A | * | 9/1996 | Whitby et al. ........... 198/470.1 |
| 5,598,859 A | * | 2/1997 | Kronseder .................... 134/62 |

FOREIGN PATENT DOCUMENTS

| | | | | |
|---|---|---|---|---|
| EP | 1 028 075 A | | 8/2000 | |
| FR | 2 774 666 A | | 8/1999 | |
| GB | 2193507 A | * | 2/1988 | ................. 198/402 |

* cited by examiner

Primary Examiner—James R. Bidwell
(74) Attorney, Agent, or Firm—Sughrue Mion, PLLC

(57) ABSTRACT

A device for inverting hollow bodies gripped by the neck, characterized in that it includes a series of gripper mounted at the periphery of a rotary wheel and each of which is adapted to grip a hollow body by the neck, and each gripper is mounted on a wheel so as to be tilted between a first and a second position, and each gripper is designed to grip the neck of the hollow body at two substantially opposite points on either side of the neck axis, and the gripper is designed to cause the neck of the hollow body to be engaged in the gripper by one side of the gripper and to be released by the other side of the gripper, with substantially radial movements relative to the neck axis.

13 Claims, 4 Drawing Sheets

DEVICE FOR INVERTING A HOLLOW BODY

The invention relates to devices for manipulating hollow bodies, particularly devices intended to be integrated into bottling lines.

In particular, the invention will find application in bottling lines of plastic containers in which the containers have a neck of perfectly defined and standardized geometric shape so that the manipulation of the containers along the bottling line is preferably done by the neck.

This is particularly the case for bottling lines intended to produce, clean, sterilize and refill containers made of polyethylene terephtalate (PET), with these containers in the form of bottles or jars.

Such containers are manufactured first by injection molding an appreciably tubular preform that is closed at one of its ends, the other end having the final shape of the neck of the container. This neck generally has threading for screwing on a cap, and at the base of this threading, a small external collar that forms a support surface used to transport the preform, then the container.

From this preform, the final container is obtained in a blow-molding machine.

Whether for the manipulation of the preform prior to blow molding, or for the subsequent manipulation of the containers on the bottling line, preferably systems are used in which the container is grasped by the neck, generally by elastic tongs.

During the manipulation of the preforms or containers held by the neck, it is often necessary to invert the hollow body along its path in the bottling line. Thus, while it is obviously necessary for the container to be presented with the neck up for the filling operation, it is necessary for it to be presented with the neck down for other operations such as rinsing the interior space, in order to facilitate draining the rinse fluid. Moreover, it will be noted that in many blow-molding machines, the reheating of the preform is preferably performed with a preform being presented with the neck down, while the blow-molding of the preform is done by inserting the preform into the mold with the neck upward. Thus, there is still the need to invert the hollow body.

A purpose of the invention, therefore, is to propose a device for inverting hollow bodies between two consecutive processing units of a bottling line.

Known in the prior art are numerous machines for processing hollow bodies in which said bodies are inverted. Thus, in rinsing machines the container is generally engaged on a carrousel provided with inverter tongs. The container is engaged neck upward, is inverted by tongs to take it neck downward over spray nozzles, then before leaving the machine, the inverter tongs return the hollow body to its initial neck upward position. Indeed, the inverter tongs are generally designed so that they allow the container to be engaged radially from the exterior toward the interior with reference to the axis of rotation of the carrousel. In the inverted position, these tongs only allow the release of the bottle in the same direction, radially toward the interior.

In conventional systems for conveying hollow bodies, the hollow bodies are successively transferred on to rotary systems that follow arc-of-circle paths, these arcs of circle being tangent at the exterior. Thus, the inverter tongs of the type used in current rinsing machines can not be used when it is desired, on a hollow body transfer wheel, to invert the hollow body in order to transfer it in this inverted position to another transfer wheel or another carrousel processing apparatus tangent to the wheel in question.

In order to remedy this problem, the invention proposes a device for inverting hollow bodies held by the neck, characterized in that it comprises a series of tongs that are mounted at the periphery of a rotary wheel and each of which tongs are able to grasp a hollow body by the neck, in that each set of tongs is mounted on the wheel in such a way as to be able to swing between at least a first and a second position, and in that set of tongs is constructed to grip the neck of the hollow body at two appreciably opposite places on either side of the axis of the neck, and in that the tongs are constructed to allow the neck of the hollow body to be engaged in the tongs by one side of the tongs and that it is released from the other side of the tongs, according to the appreciably radial movements with reference to the axis of the neck.

According to other characteristics of the invention:

each of the tongs include grippers that are provided for grasping the neck of the hollow body at two appreciably opposite places of each side of the axis of the neck of the hollow body, and the tongs include two openings, appreciably diametrically opposite with reference to the axis of the neck of the hollow body, which openings allow the neck of the hollow body to be engaged in the tongs radially through one of the openings and it is radially released through the other opening;

the first and the second position of the tongs are respectively positions of engagement and release of the hollow body in the tongs;

the grippers of the tongs are carried by elastically deformable arms so that the neck of the hollow body is engaged and released by a locking mechanism;

the grippers are carried by articulated arms that are controlled toward a position of gripping the neck of a hollow body;

the arms of each set of tongs extend appreciably parallel to the axis of the neck of the hollow body during the engagement or the release;

the tongs are designed to grasp hollow bodies the neck of which is provided, at its base, with a small radial holding collar, the tongs being designed to grasp the neck above the small collar;

the hollow bodies have, above their collar, a ring-shaped groove into which the grippers of the tongs lock;

the device has an entry wheel on which the hollow bodies are supported on their collar in such a way as to describe a circular path that is tangent at an entrance point to the path of the tongs carried by the inverter wheel, and the entry wheel and the inverter wheel are synchronized so that a hollow body and a set of tongs arrive simultaneously at the point of tangency so that the hollow body is radially engaged between the grippers of the tongs;

the device has an exit wheel that has means for grasping the hollow bodies after they have been inverted, said means following a path tangent to the path of the tongs, at an exit point, and the inverter tongs are swung from their first position to their second position between the entry point and the exit point;

the inverter tongs are returned from their second position to their first position between the exit point and the entry point;

the paths of the hollow bodies on the entry wheel and on the exit wheel are tangent to the outside of the path of the hollow bodies on the inverter wheel; and each set of inverter tongs is made from a single piece of plastic material.

Other characteristics and advantages of the invention will appear from the following detailed description, as well as from the attached drawings in which.

Figure 1:
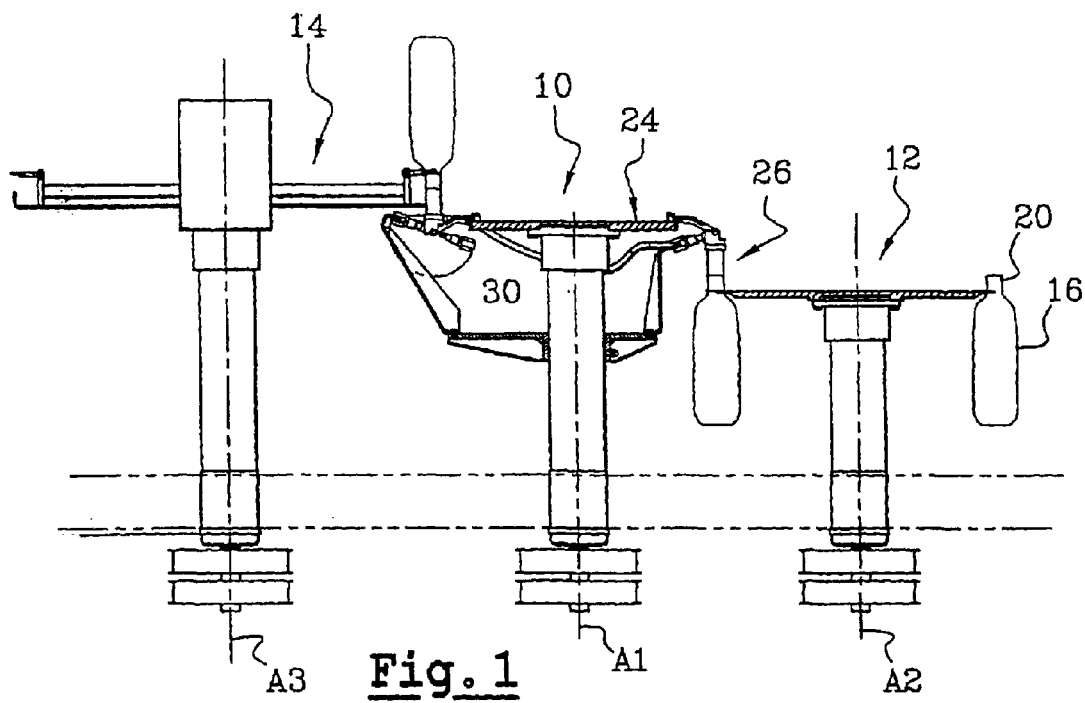
FIG. 1 is a diagrammatic side view of an inverter device according to the features of the invention, interposed between an upstream wheel and a downstream wheel.
Figure 2:
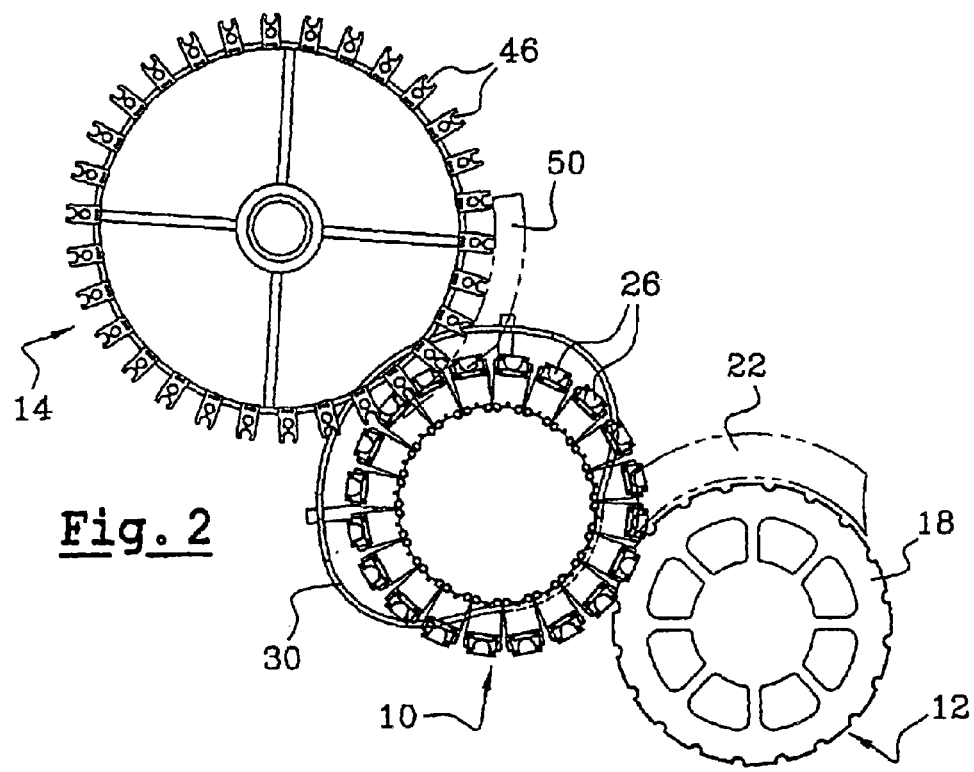
FIG. 2 is a diagrammatic top view of the device of FIG. 1.

Illustrated in FIGS. 1 and 2 is an inverter device 10, according to the features of the invention, interposed between an upstream transfer wheel 12 and a downstream wheel 14 on which the hollow body 16, gripped by the neck in the neck-down position, are going to undergo a rinse treatment, for example, by spraying liquid into each hollow body. In the case illustrated, the hollow bodies 16 are PET bottles, but the invention can also be implemented for other types of containers or for preforms.

The upstream wheel 12 has a plate 18 with recesses in which the containers 16 are engaged at a point not shown, and the horizontal plate 18 being driven in rotation around its vertical axis A2, the containers 16 are driven in an arc-of-circle path. To do this, the neck 20 of the container 16 is engaged in one of the recesses of the plate 18, its collar 41 being supported vertically downward on the upper face of the plate 18. Moreover, the transfer wheel 12 has an external guide 22 that extends in a arc of circle around the axis A2, at the same height as the plate 18. The guide 22 is arranged so that its inner radial edge is at a predetermined distance from the bottom of the recesses of the plate 18, said distance corresponding to the diameter of the neck 20.

According to the invention, the inverter device 10 essentially comprises a rotary wheel 24 with vertical axis A1, which is therefore parallel to the axis A2. At its periphery, the wheel 24 has a series of tongs 26 each of which is intended to grasp a container 16 by its neck. Each set of tongs 26 is mounted on the wheel 24 by means of a pivot head 28, which, as shown more particularly in FIGS. 2 to 5, allows the tongs 26 to swing around an axis An that is appreciably tangent to the circular path of the wheel 24, between a first position of grasping the container, illustrated in FIGS. 3 and 4, and a second position illustrated in FIGS. 5 and 6 in which the container 16 is inverted. Of course, depending on the application for which the inverter device is intended, the initial and final positions of the tongs may be other than vertical positions.

The swinging of the control head 28 is here controlled by a cam and cam follower system. The cam is in the form of a bar 30 with circular cross section that extends along a predetermined path around the axis A1. Each swing head has a cam follower in the form of a U-shaped bracket 32 rigidly connected to the swing head 28 by a lever 33 extending into a plane perpendicular to the swing axis An of the head 28 in question, therefore in a radial plane with reference to axis A1. The bracket 32 can therefore only describe an arc-of-circle path around the swing axis An of the tongs 28 that it controls. Moreover, it is engaged around the control bar 30 the profile of which causes the angular displacement of the bracket around the axis An when the bracket is moved with the tongs 26 in rotation around the axis A1.

Such a device for controlling the swing of the tongs is known, and for example is widely used in rinsing machines.

In the example illustrated in the figures, the tongs 26 are made from a single piece of plastic material. Each set of tongs 26 has an upper cross piece 34 that is appreciably parallel to the axis An and by which the tongs 26 are attached to the swing head 28. On either side of a radial plane containing the axis A1 of rotation of the inverter device, the tongs 26 have two arms 36 which, in the position illustrated in FIG. 4, extend vertically downward. At their lower end, each of the arms 36 has a gripper 38 which extends appreciably in a direction tangential to the axis A1, toward the other arm 36. The two grippers 38 therefore face each other and have contact surfaces 40 suitable for grasping a hollow body by its neck. In the case of polyethylene terephtalate bottles 16 of the type illustrated in the figures, the neck 20 of the hollow body has, above the radial collar 41, a ring-shaped groove 42 located axially between the collar and the screw threads of the neck. The contact surfaces 40 of the grippers 38 are therefore in an arc of circle to be able to fit tightly around the neck of the preform in diametrically opposite portions of the groove 42 with reference to the axis of the neck. It is preferable that the grippers 38, the contact surfaces of which are of a shape complementary to those of the groove 42, clamp tightly enough onto the neck 20 so that the containers grasped in this way can not vibrate.

According to the features of the invention, because the two grippers 38 are diametrically opposite, they are separated from each other, on each side, by two openings 44 that are diametrically opposite with reference to the axis of the neck of the hollow body when said body is engaged in the tongs 26. According to the invention, these two openings 44 enable the hollow body to be radially engaged from one side of the tongs 26 through a first of the two openings 44, and can be released from the other side of the tongs, through the other opening. It is possible for the two openings 44 to be identical in order to allow the hollow body to enter or be released from the tongs equally well. Moreover, it will be noted that the openings illustrated in the figures have chamfers 48 to facilitate the engagement of the hollow body onto the tongs.

The size of the openings 44 separating the two grippers 28 will be adjusted according to the diameter of the neck of the hollow body to be grasped. These openings must be small enough so that, when the hollow body is engaged on the tongs, it can not be radially disengaged. However, they must be large enough so that the force of the grip on the neck in the tongs does not cause deformation of the neck or excessive deformation of the tongs.

In the example illustrated, the tongs 26 are made of one piece so that the gripping of the neck in the tongs is accomplished simply by the elastic deformation of the arms 36.

However, the arms 36 could also be articulated on the upper cross piece 34, and controlled to a gripping position allowing them to grip the neck of the hollow body. The means of control of such tongs can be positive means, such as a hydraulic cylinder, or elastic means such as a spring.

Figure 3:
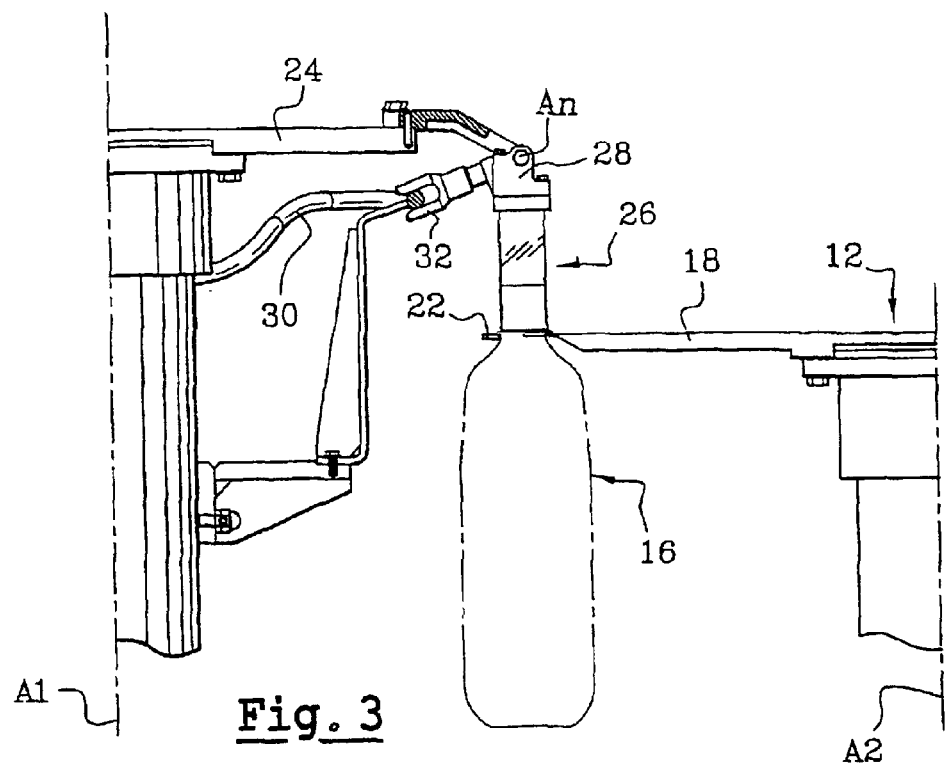
FIG. 3 is an enlarged detail view of FIG. 1, illustrating more particularly the engaging of a container on a set of inverter tongs according to the features of the invention.
Figure 4:
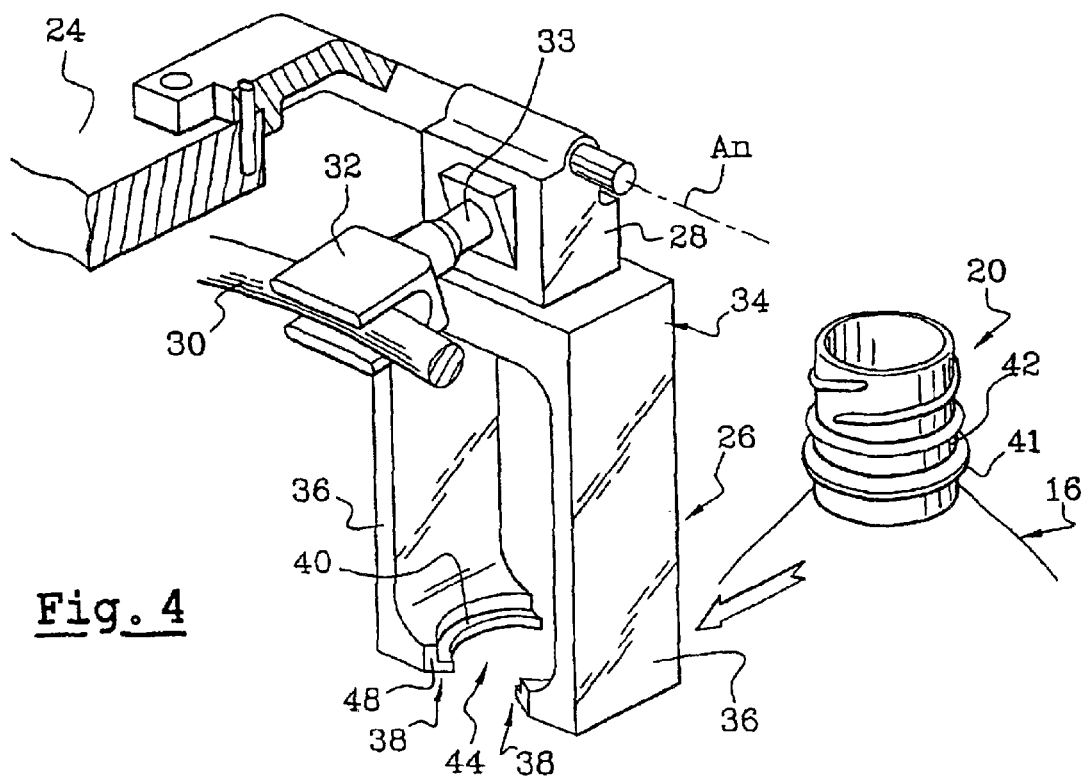
FIG. 4 is a partially exploded view in perspective illustrating the situation of FIG. 3.
Figure 5:
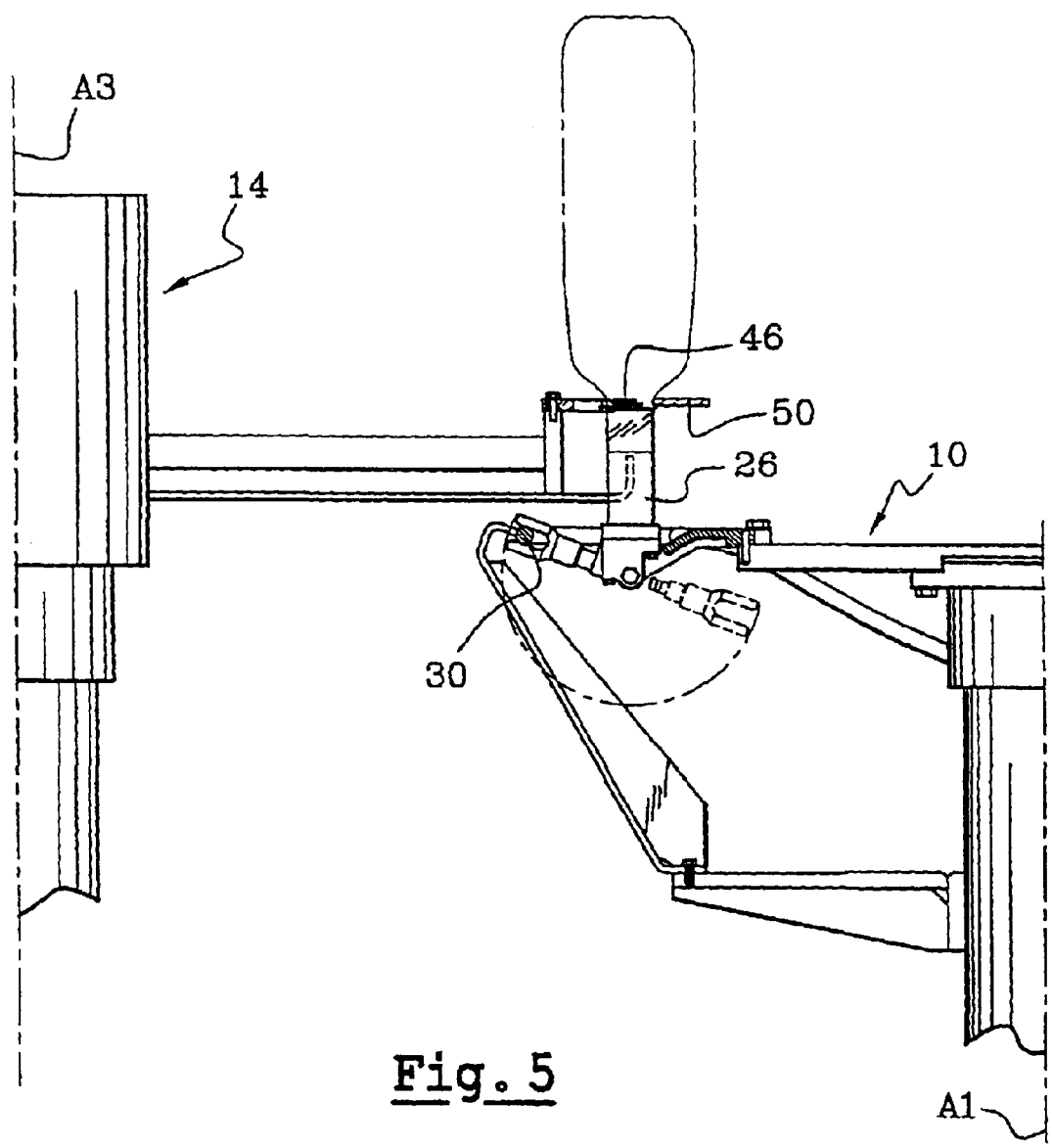
FIGS. 5 and 6 are similar views to those in FIGS. 3 and 4, illustrating the release of the container in the inverted position.

As a result of the invention, the figures show that the hollow body 16 is engaged on the tongs 26 radially from the exterior toward the interior when the tongs 26 are in the lower position illustrated in FIGS. 3 and 4. This engagement is done at the point of entry of the inverter device that corresponds to the point of tangency between the path followed by the hollow bodies on the upstream wheel 12, and the path of the tongs 26 on the inverter device around the axis A1. These two paths are tangential to each other at the outside. Once the hollow body has been grasped by the tongs 26, it leaves the upstream wheel 12, which is allowed because the outer guide 22 does not extend beyond the point of entry. It will be noted that the relative engagement movement of the hollow body with reference to the tongs 28 is appreciably a purely radial movement, since the hollow body and the tongs 26 are each driven in a circular movement around axes A1 and A2, respectively, these axes being parallel.

Once the hollow body has been driven beyond the entry point by the circular movement of the inverter device around the axis A1, the cam 30 causes the tongs 26 and the hollow body 16 to swing, in the example illustrated, 180° into a vertical position with the neck down.

In this position, the hollow body 16 reaches the point of tangency with the path of fixed grippers 46 carried by the downstream wheel 14. These grippers 46 are designed to grasp the neck of the container just above the small collar 41 when the container 16 is neck-down. This corresponds to the area of the neck located just below the small collar 41 when the container is in the normal neck-up position, that is, near the body of the container.

At the point of tangency, the neck of the container 16 is then grasped on the one hand by the tongs 26 and on the other hand by one of the grippers 46 of the downstream wheel 14. Said grippers 46 can be elastic grippers or controlled grippers. If the grippers 46 are elastic, another fixed external guide 50 will preferably be provided, as illustrated in the figures, in an arc of circle around the axis A3 of the downstream wheel 14 to force the release of the hollow body from the tongs 26 of the inverter device. Of course, the external exit guide 50 is situated vertically at the same level as the grippers 46 of the downstream wheel 14 so that it does not interfere with the tongs 26 of the inverter device.

Figure 6:
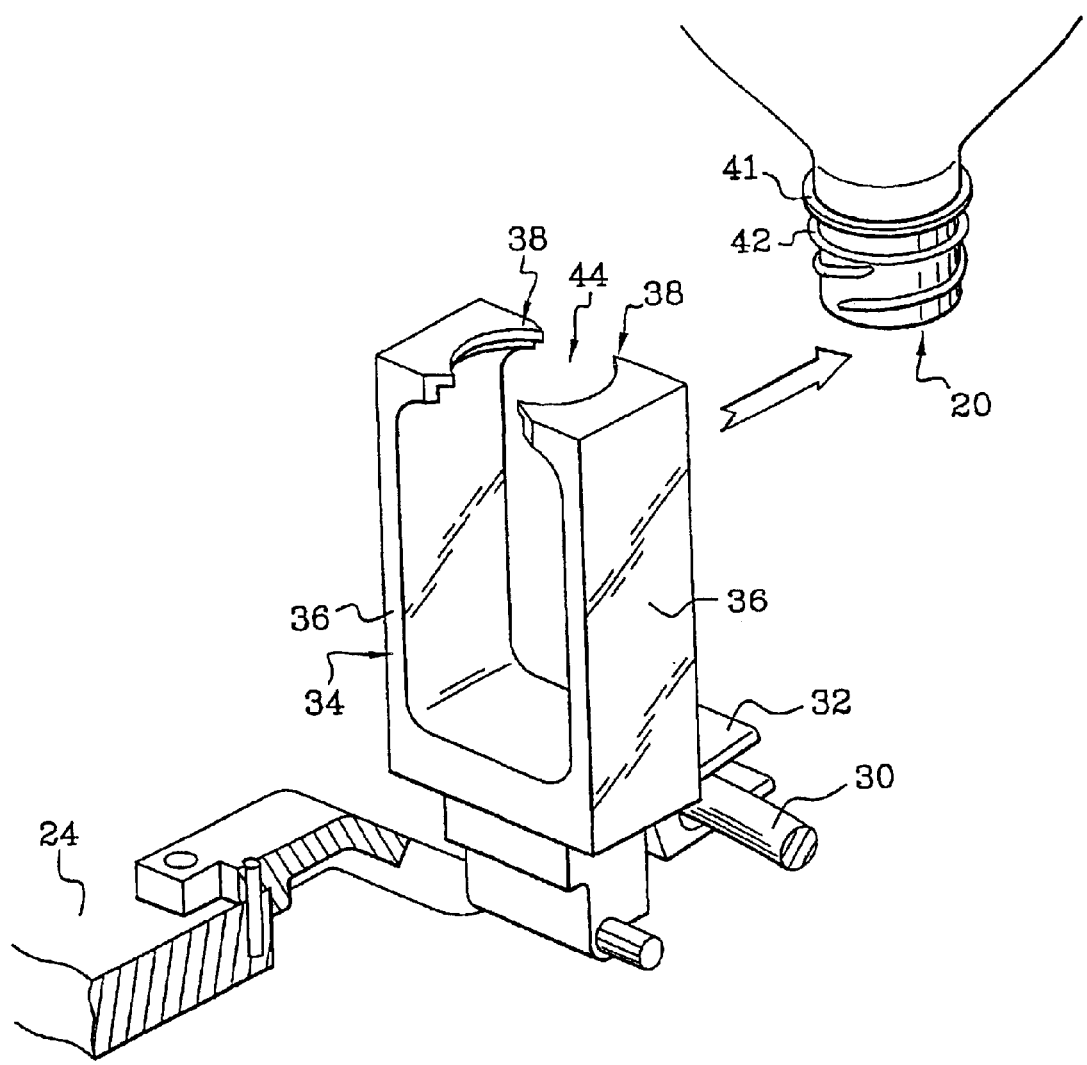

As can be seen by comparing FIGS. 4 and 6, the hollow body 16 is released from the tongs through the opening 44 that is opposite to the opening 44 through which it was engaged on the tongs 26.

Beyond the exit point, and before arriving again at the entry point, the cam 30 returns the tongs 26 to their initial lower position.

Thus, because of the invention, a device is proposed for turning over hollow bodies grasped by the neck, that is simple, compact and reliable.

What is claimed is:

1. A device for inverting hollow bodies held by a neck, the device comprising a series of tongs which are mounted at a periphery of a rotary wheel, the tongs being configured to grasp a hollow body by a neck and being mounted on the rotary wheel so as to swing between at least a first and a second position, the tongs being constructed to grip the neck of the hollow body at two opposite places on the neck, and the tongs being constructed to allow the neck of the hollow body to be engaged in the tongs by entering through one side of the tongs and released from another side of the tongs.

2. The device according to claim 1, wherein the tongs include:

grippers that are provided to grasp the neck of the hollow body at two opposite places of the neck of the hollow body, and two openings, diametrically opposite with reference to an axis of the neck of the hollow body, the openings allow the neck of the hollow body to be engaged in the tongs radially through one of the openings and to be radially released through the other opening.

3. The device according to claim 1, wherein the first position and the second position of the tongs are respectively positions of engagement and release of the hollow body in the tongs.

4. The device according to claim 2, wherein the grippers of the tongs are carried by elastically deformable arms so that the neck of the hollow body is engaged and released from the tongs by a locking mechanism.

5. The device according to claim 2, wherein the grippers are carried by articulated arms that are controlled toward a position of gripping the neck of the hollow body.

6. The device according to claim 4, wherein the arms the tongs extend parallel to the axis of the neck of the hollow body during at least one of when the neck of the hollow body is engaged and released.

7. The device according to claim 1, wherein a base of the neck is provided with a radial holding collar, and the tongs are operable to grasp the neck above the radial holding collar.

8. The device according to claim 1, wherein the hollow bodies have a collar, and a ring-shaped groove above the collar into which grippers of the tongs lock.

9. The device according to claim 1, wherein the hollow bodies respectively comprise a collar, and the device further includes an entry wheel on which the hollow bodies are supported by their collar in such a way as to define a circular path that is tangent at an entrance point to a path of the tongs carried by the rotary wheel, and in that the entry wheel and the rotary wheel are synchronized so that the hollow body and a set of the tongs arrive simultaneously at a point of tangency so that the hollow body is radially engaged between grippers of the tongs.

10. The device according to claim 9, wherein the device is configured so that the hollow bodies are inverted while being engaged by the tongs, and wherein the device further comprises an exit wheel that has means for grasping the hollow bodies after they have been inverted, said means following a path tangent to the path of the tongs, at an exit point, and the tongs being swung from the first position to the second position between the entrance point and the exit point.

11. The device according to claim 10, wherein the tongs are returned from the second position to the first position between the exit point and the entrance point.

12. The device according to claim 10, wherein the paths of the hollow bodies on the entry wheel and on the exit wheel are tangent to an outside of a path of the hollow bodies on the rotary wheel.

13. The device according to claim 1, wherein the tongs are respectively made from a single piece of plastic material.

* * * * *